(12) United States Patent
Hillan et al.

(10) Patent No.: US 9,240,824 B2
(45) Date of Patent: Jan. 19, 2016

(54) WIRELESS POWER AND WIRELESS COMMUNICATION FOR ELECTRONIC DEVICES

(75) Inventors: John Hillan, Hants (GB); Miles A. Kirby, San Deigo, CA (US); Ernest T. Ozaki, Poway, CA (US); Stuart A. Heilsberg, San Deigo, CA (US); Michael J. Mangan, San Diego, CA (US); Stephen Frankland, Horsham (GB)

(73) Assignee: QUALCOMM Incorporated, San Diego, CA (US)

( * ) Notice: Subject to any disclaimer, the term of this patent is extended or adjusted under 35 U.S.C. 154(b) by 475 days.

(21) Appl. No.: 12/697,970

(22) Filed: Feb. 1, 2010

(65) Prior Publication Data

US 2010/0279606 A1  Nov. 4, 2010

Related U.S. Application Data

(60) Provisional application No. 61/152,354, filed on Feb. 13, 2009, provisional application No. 61/164,372, filed on Mar. 27, 2009.

(51) Int. Cl.
*H04B 5/02* (2006.01)
*H04B 5/00* (2006.01)

(52) U.S. Cl.
CPC .................................... *H04B 5/00* (2013.01)

(58) Field of Classification Search
CPC ........................................................ H04B 5/02
USPC ................ 455/41.1, 41.2, 572, 573; 320/108; 307/45; 340/10.1; 343/866
See application file for complete search history.

(56) References Cited

U.S. PATENT DOCUMENTS

| 5,536,979 | A * | 7/1996 | McEachern | H02J 7/025 307/104 |
| 2005/0063488 | A1 * | 3/2005 | Troyk | G06K 7/0008 375/316 |
| 2005/0077356 | A1 * | 4/2005 | Takayama | G06K 7/10237 235/451 |
| 2006/0145660 | A1 * | 7/2006 | Black | H02J 7/025 320/108 |
| 2007/0228833 | A1 * | 10/2007 | Stevens | H02J 5/005 307/45 |

(Continued)

FOREIGN PATENT DOCUMENTS

| CN | 1954472 A | 4/2007 |
| CN | 101656436 A | 2/2010 |

(Continued)

OTHER PUBLICATIONS

International search report and Written Opinion—PCT/US2010/024156, International Search Authority—European Patent Office—Aug. 10, 2010.

(Continued)

*Primary Examiner* — April G Gonzalez
(74) *Attorney, Agent, or Firm* — Knobbe Martens Olson & Bear LLP

(57) ABSTRACT

Exemplary embodiments are directed to wireless electronic devices. A method may comprise receiving a wireless signal with an antenna and identifying one of a wireless charging module and a near-field communication module to which the received signal is associated. The method may further comprise conveying the received signal to the identified one of the wireless charging module and the near-field communication module.

22 Claims, 9 Drawing Sheets

(56) References Cited

U.S. PATENT DOCUMENTS

| | | | |
|---|---|---|---|
| 2008/0039903 A1 | 2/2008 | Chadwick | |
| 2008/0272889 A1* | 11/2008 | Symons | H02J 7/025 340/10.1 |
| 2009/0001930 A1* | 1/2009 | Pohjonen | H01Q 1/2225 320/108 |
| 2010/0190436 A1 | 7/2010 | Cook et al. | |
| 2010/0225270 A1 | 9/2010 | Jacobs et al. | |
| 2011/0050164 A1 | 3/2011 | Partovi et al. | |
| 2012/0149301 A1 | 6/2012 | Wiley | |

FOREIGN PATENT DOCUMENTS

| | | |
|---|---|---|
| EP | 1096641 A1 | 5/2001 |
| EP | 1575183 | 9/2005 |
| EP | 2157705 A2 | 2/2010 |
| EP | 2251836 A2 | 11/2010 |
| GB | 2429372 | 2/2007 |
| JP | 7154288 A | 6/1995 |
| JP | 2001307032 A | 11/2001 |
| JP | 2003069335 A | 3/2003 |
| JP | 2004342040 A | 12/2004 |
| JP | 2011154435 A | 8/2011 |
| JP | 2012503466 A | 2/2012 |
| JP | 2013084243 A | 5/2013 |
| WO | 9749076 A1 | 12/1997 |
| WO | 0057531 A1 | 9/2000 |
| WO | 2005109597 A1 | 11/2005 |
| WO | WO-2010035256 A2 | 4/2010 |
| WO | 2010093973 | 8/2010 |

OTHER PUBLICATIONS

Partial International Search Report—PCT/US2010/024156—International Search Authority EPO—Jun. 8, 2010.

Van Boheemen, E.L. et al., "Near-field coupled antennas for use in Inductive Power Transfer Communication Systems", Industrial Electronics, 2008. IECON 2008. 34th Annual Conference of IEEE, Issue Date: Nov. 10-13, 2008, pp. 1504-1509.

* cited by examiner

WIRELESS POWER AND WIRELESS COMMUNICATION FOR ELECTRONIC DEVICES

CLAIM OF PRIORITY UNDER 35 U.S.C. §119

This application claims priority under 35 U.S.C. §119(e) to:

U.S. Provisional Patent Application 61/152,354 entitled "WIRELESS CHARGING COEXISTENCE" filed on Feb. 13, 2009, the disclosure of which is hereby incorporated by reference in its entirety; and U.S. Provisional Patent Application 61/164,372 entitled "ANTENNA SHARING BETWEEN NFC AND WIRELESS CHARGING" filed on Mar. 27, 2009, the disclosure of which is hereby incorporated by reference in its entirety.

BACKGROUND

1. Field

The present invention relates generally to wireless electronic devices, and more specifically to electronic devices configured for wireless communication and wireless charging.

2. Background

Typically, each battery powered device requires its own charger and power source, which is usually an AC power outlet. This becomes unwieldy when many devices need charging.

Approaches are being developed that use over the air power transmission between a transmitter and the device to be charged. These generally fall into two categories. One is based on the coupling of plane wave radiation (also called far-field radiation) between a transmit antenna and receive antenna on the device to be charged which collects the radiated power and rectifies it for charging the battery. Antennas are generally of resonant length in order to improve the coupling efficiency. This approach suffers from the fact that the power coupling falls off quickly with distance between the antennas. So charging over reasonable distances (e.g., >1-2 m) becomes difficult. Additionally, since the system radiates plane waves, unintentional radiation can interfere with other systems if not properly controlled through filtering.

Other approaches are based on inductive coupling between a transmit antenna embedded, for example, in a "charging" mat or surface and a receive antenna plus rectifying circuit embedded in the host device to be charged. This approach has the disadvantage that the spacing between transmit and receive antennas must be very close (e.g. mms). Though this approach does have the capability to simultaneously charge multiple devices in the same area, this area is typically small, hence the user must locate the devices to a specific area.

A need exists for an electronic device having both wireless charging and near-field communication functionalities. More specifically, a need exists for an electronic device configured to utilize wireless charging and near-field communication technologies in an efficient manner while reducing interference between the two technologies.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form of energy associated with electric fields, magnetic fields, electromagnetic fields, or otherwise that is transmitted between from a transmitter to a receiver without the use of physical electromagnetic conductors.

Figure 1:
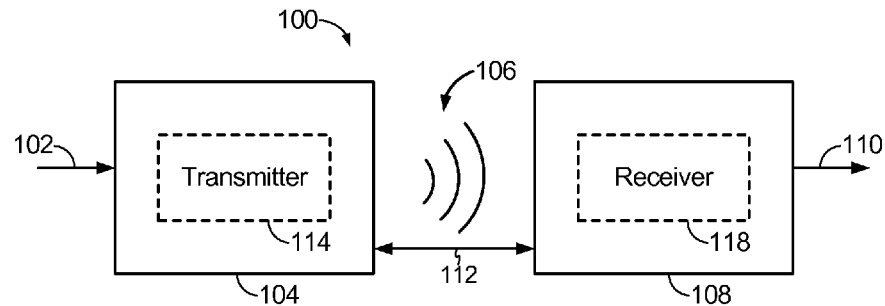
FIG. 1 shows a simplified block diagram of a wireless power transfer system.

FIG. 1 illustrates a wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
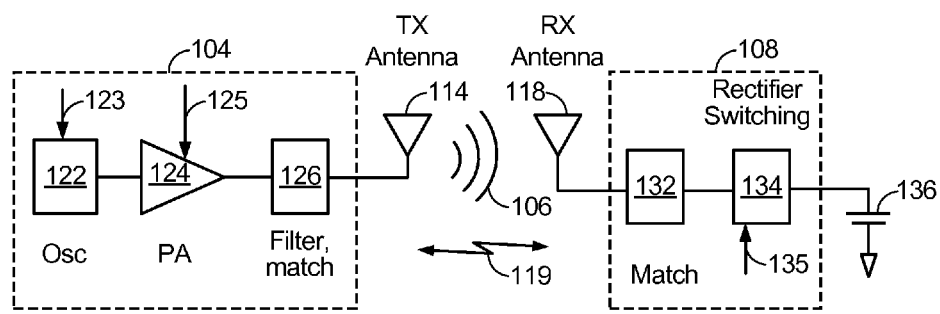
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate a signal at a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, zigbee, cellular, etc).

Figure 3:
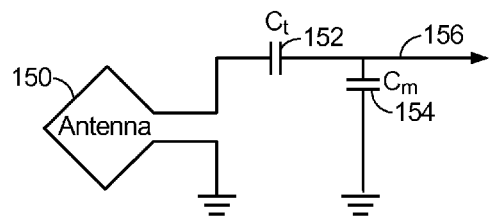
FIG. 3 shows a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Exemplary embodiments of the invention include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the invention, magnetic type antennas such as single and multi-turn loop antennas are used for both transmit (Tx) and receive (Rx) antenna systems since magnetic near-field amplitudes tend to be higher for magnetic type antennas in comparison to the electric near-fields of an electric-type antenna (e.g., a small dipole). This allows for potentially higher coupling between the pair. Furthermore, "electric" antennas (e.g., dipoles and monopoles) or a combination of magnetic and electric antennas is also contemplated.

The Tx antenna can be operated at a frequency that is low enough and with an antenna size that is large enough to achieve good coupling (e.g., >−4 dB) to a small Rx antenna at significantly larger distances than allowed by far field and inductive approaches mentioned earlier. If the Tx antenna is sized correctly, high coupling levels (e.g., −2 to −4 dB) can be achieved when the Rx antenna on a host device is placed within a coupling-mode region (i.e., in the near-field) of the driven Tx loop antenna. It is noted that although FIG. 3 illustrates a single ended topology, a differential antenna topology is within the scope of the invention.

Figure 4:
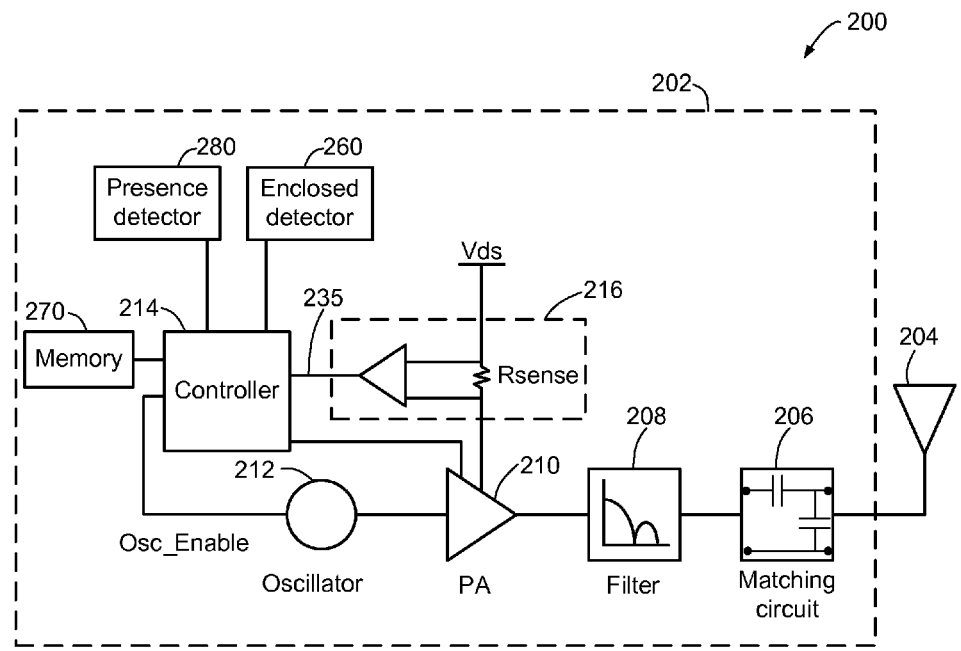
FIG. 4 is a simplified block diagram of a transmitter, in accordance with an exemplary embodiment of the present invention.

FIG. 4 is a simplified block diagram of a transmitter 200, in accordance with an exemplary embodiment of the present invention. The transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current draw by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a controller 214 for enabling the oscillator 212 during transmit phases (or duty cycles) for specific receivers, for adjusting the frequency of the oscillator, and for adjusting the output power level for implementing a communication protocol for interacting with neighboring devices through their attached receivers.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by controller 214 for use in determining whether to enable the oscillator 212 for transmitting energy to communicate with an active receiver.

Transmit antenna 204 may be implemented as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency. In an exemplary application where the transmit antenna 204 may be larger in diameter, or length of side if a square loop, (e.g., 0.50 meters) relative to the receive antenna, the transmit antenna 204 will not necessarily need a large number of turns to obtain a reasonable capacitance.

The transmitter 200 may gather and track information about the whereabouts and status of receiver devices that may be associated with the transmitter 200. Thus, the transmitter circuitry 202 may include a presence detector 280, an enclosed detector 290, or a combination thereof, connected to the controller 214 (also referred to as a processor herein). The controller 214 may adjust an amount of power delivered by the amplifier 210 in response to presence signals from the presence detector 280 and the enclosed detector 290. The transmitter may receive power through a number of power sources, such as, for example, an AC-DC converter (not shown) to convert conventional AC power present in a building, a DC-DC converter (not shown) to convert a conventional DC power source to a voltage suitable for the transmitter 200, or directly from a conventional DC power source (not shown).

As a non-limiting example, the presence detector 280 may be a motion detector utilized to sense the initial presence of a device to be charged that is inserted into the coverage area of the transmitter. After detection, the transmitter may be turned on and the RF power received by the device may be used to toggle a switch on the Rx device in a pre-determined manner, which in turn results in changes to the driving point impedance of the transmitter.

As another non-limiting example, the presence detector 280 may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

As a non-limiting example, the enclosed detector 290 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 200 does not remain on indefinitely may be used. In this case, the transmitter 200 may be programmed to shut off after a user-determined amount of time. This feature prevents the transmitter 200, notably the power amplifier 210, from running long after the wireless devices in its perimeter are fully charged. This event may be due to the failure of the circuit to detect the signal sent from either the repeater or the receive coil that a device is fully charged. To prevent the transmitter 200 from automatically shutting down if another device is placed in its perimeter, the transmitter 200 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
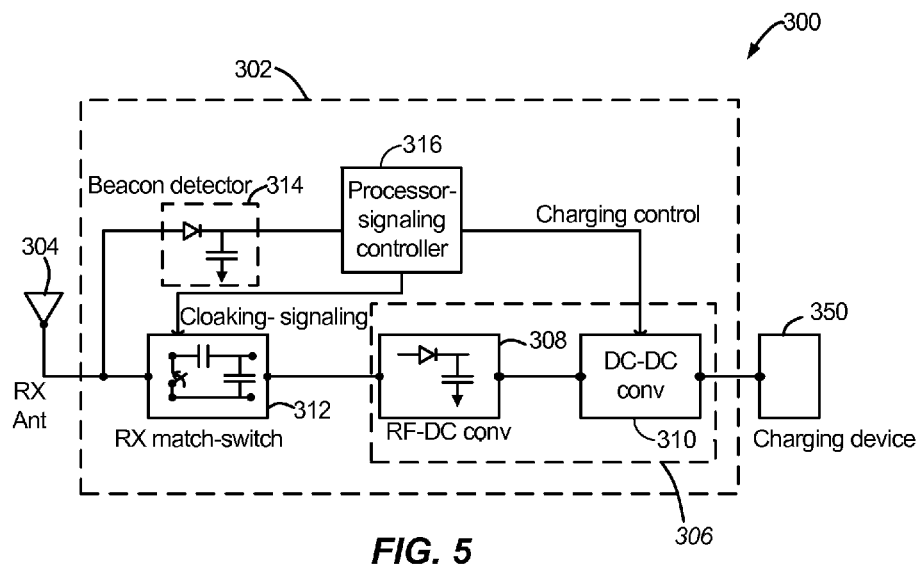
FIG. 5 is a simplified block diagram of a receiver, in accordance with an exemplary embodiment of the present invention.

FIG. 5 is a simplified block diagram of a receiver 300, in accordance with an exemplary embodiment of the present invention. The receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or near the same frequency, as transmit antenna 204 (FIG. 4). Receive antenna 304 may be similarly dimensioned with transmit antenna 204 or may be differently sized based upon the dimensions of the associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated, including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2).

As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking." Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 μsec.

In an exemplary embodiment, communication between the transmitter and the receiver refers to a device sensing and charging control mechanism, rather than conventional two-way communication. In other words, the transmitter uses on/off keying of the transmitted signal to adjust whether energy is available in the near-filed. The receivers interpret these changes in energy as a message from the transmitter. From the receiver side, the receiver uses tuning and de-tuning of the receive antenna to adjust how much power is being accepted from the near-field. The transmitter can detect this difference in power used from the near-field and interpret these changes as a message from the receiver.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

Figure 6:
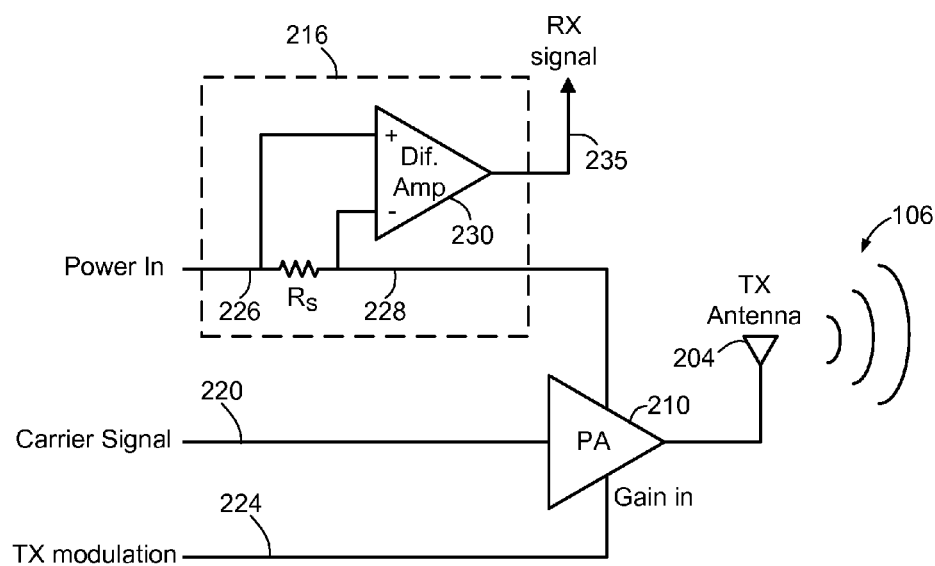
FIG. 6 shows a simplified schematic of a portion of transmit circuitry for carrying out messaging between a transmitter and a receiver.

FIG. 6 shows a simplified schematic of a portion of transmit circuitry for carrying out messaging between a transmitter and a receiver. In some exemplary embodiments of the present invention, a means for communication may be enabled between the transmitter and the receiver. In FIG. 6 a power amplifier 210 drives the transmit antenna 204 to generate the radiated field. The power amplifier is driven by a carrier signal 220 that is oscillating at a desired frequency for the transmit antenna 204. A transmit modulation signal 224 is used to control the output of the power amplifier 210.

The transmit circuitry can send signals to receivers by using an ON/OFF keying process on the power amplifier 210. In other words, when the transmit modulation signal 224 is asserted, the power amplifier 210 will drive the frequency of the carrier signal 220 out on the transmit antenna 204. When the transmit modulation signal 224 is negated, the power amplifier will not drive out any frequency on the transmit antenna 204.

The transmit circuitry of FIG. 6 also includes a load sensing circuit 216 that supplies power to the power amplifier 210 and generates a receive signal 235 output. In the load sensing circuit 216 a voltage drop across resistor $R_s$ develops between the power in signal 226 and the power supply 228 to the power amplifier 210. Any change in the power consumed by the power amplifier 210 will cause a change in the voltage drop that will be amplified by differential amplifier 230. When the transmit antenna is in coupled mode with a receive antenna in a receiver (not shown in FIG. 6) the amount of current drawn by the power amplifier 210 will change. In other words, if no coupled mode resonance exist for the transmit antenna 204, the power required to drive the radiated field will be a first amount. If a coupled mode resonance exists, the amount of power consumed by the power amplifier 210 will go up because much of the power is being coupled into the receive antenna. Thus, the receive signal 235 can indicate the presence of a receive antenna coupled to the transmit antenna 235 and can also detect signals sent from the receive antenna. Additionally, a change in receiver current draw will be observable in the transmitter's power amplifier current draw, and this change can be used to detect signals from the receive antennas.

Details of some exemplary embodiments for cloaking signals, beacon signals, and circuits for generating these signals can be seen in U.S. Utility patent application Ser. No. 12/249,873, entitled "REVERSE LINK SIGNALING VIA RECEIVE ANTENNA IMPEDANCE MODULATION" filed on Oct. 10, 2008; and in U.S. Utility patent application Ser. No. 12/249,861, entitled "TRANSMIT POWER CONTROL FOR A WIRELESS CHARGING SYSTEM" filed on Oct. 10, 2008, both herein incorporated by reference in their entirety.

Details of exemplary communication mechanisms and protocols can be seen in U.S. Utility patent application Ser. No. 12/249,866 entitled "SIGNALING CHARGING IN WIRELESS POWER ENVIRONMENT" filed on Oct. 10, 2008, the contents of which is incorporated by reference herein in its entirety.

It is noted that the term "active mode" as used herein comprises a mode of operation wherein an electronic device is actively transmitting a signal (e.g., a data signal). Further, the term "passive mode" as used herein comprises a mode of operation wherein an electronic device is capable of being detected, but is not actively transmitting a signal. It is further noted that a "passive mode" may also be referred to herein as a "listening mode."

Figure 7:
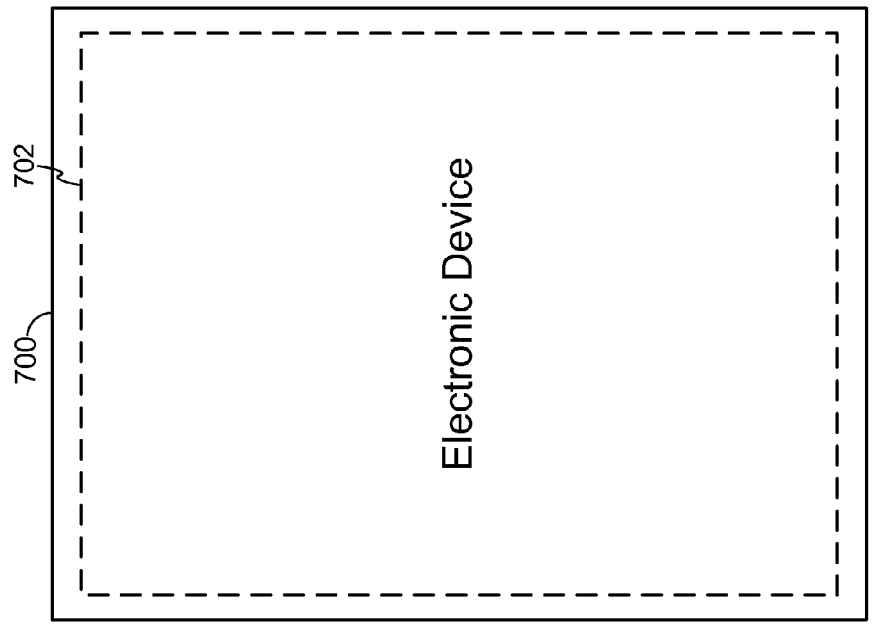
FIG. 7 illustrates an electronic device, in accordance with an exemplary embodiment of the present invention.

FIG. 7 depicts an electronic device 700 having an antenna 702. Electronic device 700 may comprise any known and suitable electronic device. As non-limiting examples, electronic device 700 may comprise a cellular telephone, a portable media player, a camera, a gaming device, a navigation device, a headset (e.g., a Bluetooth headset), a tool, a toy, or any combination thereof. As described more fully below, electronic device 700 may be configured to wirelessly receive power transmitted from a wireless power source. More specifically, antenna 702 and an associated receiver, such as receiver 108 of FIG. 2, may be configured to receive wireless power transmitted from a wireless power source. Additionally, electronic device 700 may be configured to store the received power within a battery (e.g., battery 136 of FIG. 2) of electronic device 700.

Furthermore, electronic device 700 may be configured to wirelessly communicate with at least one other electronic device via antenna 702. More specifically, as an example, electronic device 700 may be configured to establish a near-field communication (NFC) communication link with at least one other electronic device and, upon establishing the communication link, may wirelessly receive data (e.g., audio files, data files, or video files) from the at least one other electronic device via NFC means, wirelessly transmit data to the at least one other electronic device via NFC means, or both.

Figure 8:
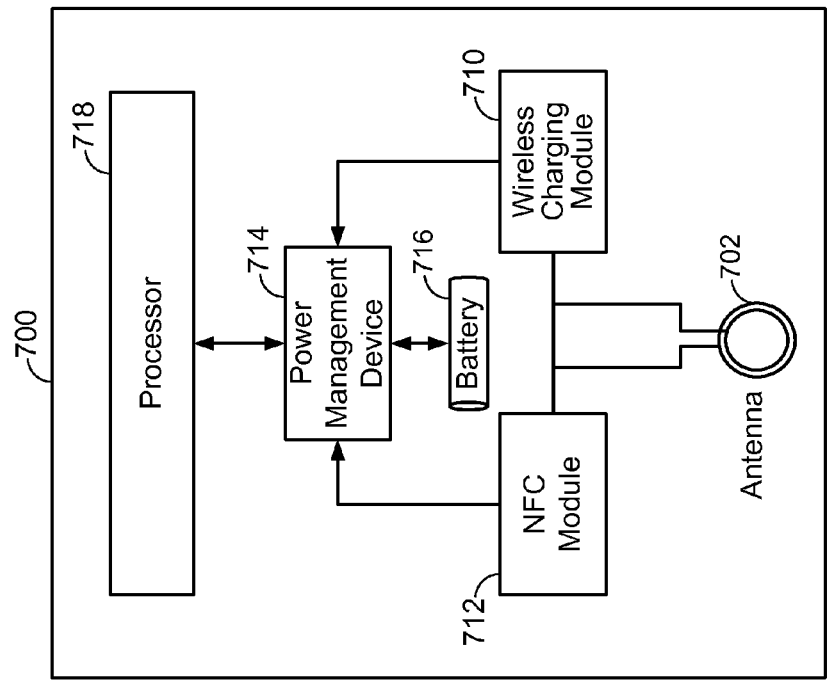
FIG. 8 is a block diagram of an electronic device, according to an exemplary embodiment of the present invention.

FIG. 8 is a functional block diagram of electronic device 700. As illustrated in FIG. 8, electronic device 700 may include antenna 702 configured for selective coupling to each of a wireless charging module 710 and a near-field communication (NFC) module 712. Wireless charging module 710 and NFC module 712 may be communicatively coupled together. Electronic device 700 may further include a battery 716 coupled to, via a power management device 714, wireless charging module 710, a NFC module 712, or both. Additionally, electronic device 700 may include a processor 718, which may include any suitable processor known in the art. As will be understood by one having ordinary skill in the art, wireless charging module 710 may be configured for providing wireless charging functionality. Similarly, NFC module 712 may be configured for providing NFC functionality. The terms "wireless charging module" and "NFC module" may also be respectively referred to herein as "wireless charging client" and "NFC client." As will also be understood by a person having ordinary skill in the art, wireless charging module 710 may be configured to operate in either a passive mode or an "off" mode and NFC module 712 may be configured to operate in an either an "off" mode, a passive mode, or an active mode.

According to one contemplated method of operation, NFC module 712 may be disabled (i.e., turned off) and wireless charging module 710 may be enabled (i.e., turned on) and operating in a passive mode. As a result, in this exemplary embodiment, a signal received by antenna 702 may be conveyed to and detected by wireless charging module 710. If a detected incoming signal comprises wireless power transmitted from a wireless charger (not shown), wireless charging module 710 may convey the wireless power to battery 716 via power management device 714. In the event that the detected signal is not intended for or is not recognized by wireless charging module 710 (e.g., the signal is associated with NFC), wireless charging module 710 may attempt to extract energy from the signal and convey the energy to battery 716.

In accordance with another contemplated method of operation, each of NFC module 712 and wireless charging module 710 may be enabled and each of NFC module 712 and wireless charging module 710 may be operating in a passive mode. Furthermore, in this exemplary embodiment, any signal transmitted from a transmitting device (not shown) and received by antenna 702 may be conveyed to each of wireless charging module 710 and NFC module 712. If one module (i.e., either wireless charging module 710 or NFC module 712) recognizes the received signal, the module may claim access to antenna 702 and the received signal. Further, the module may be able to reply, either actively or passively, to the transmitting device. For example, if a received signal comprises a data signal transmitted from another electronic device (not shown) via NFC means, NFC module 712 may claim access to antenna 702 and the received signal. Further, NFC module 712 may actively or passively transmit a reply signal to transmitting electronic device. As another example, if a received signal comprises wireless power transmitted from a wireless charger (not shown), wireless charging module 710 may claim access to antenna 702 and the received signal. Further, wireless charging module 710 may passively transmit a reply signal to the wireless charger. In the event that the received signal is not intended for or is not recognized by either wireless charging module 710 or NFC module 712, wireless charging module 710 may attempt to extract energy from the received signal for charging battery 716.

According to another contemplated method of operation, NFC module 712 and wireless charging module 710 may each be enabled and operating in a passive mode. Further, in this exemplary embodiment, all incoming signals received by antenna 702 may be initially conveyed to wireless charging module 710. If a received signal comprises wireless power transmitted from a wireless charger (not shown), wireless charging module 710 may convey the wireless power to battery 716 via power management device 714. In the event that a received signal is not intended for or is not recognized by wireless charging module 710 (e.g., the signal is associated with NFC), wireless charging module 710 may transfer the received signal to NFC module 712. Further, if the received signal is intended for and recognized by NFC module 712, NFC module 712 may claim access to antenna 702 and the received signal. Moreover, NFC module 712 may passively or actively transmit a reply signal to an electronic device that transmitted the received signal. In the event that the received signal is not intended for or is not recognized by either wireless charging module 710 or NFC module 712, wireless charging module 710 may attempt to extract energy from the received signal for charging battery 716.

In accordance with another contemplated method of operation, each of NFC module 712 and wireless charging module 710 may be turned on and operating in a passive mode. Further, in this exemplary embodiment, all incoming signals received by antenna 702 may be initially conveyed to NFC module 712. If a received signal comprises a data signal transmitted from another electronic device (not shown), NFC module 712 may claim access to antenna 702 and the received signal. In addition, NFC module 712 may transmit a reply signal, either actively or passively, to the transmitting electronic device. In the event that a received signal is not intended for or is not recognized by NFC module 712 (e.g., the signal is associated with wireless power), NFC module 712 may transfer the received signal to wireless charging module 710. If the received signal is intended for and recognized by wireless charging module 710, wireless charging module 710 may claim access to antenna 702 and the received signal. Furthermore, wireless charging module 710 may passively transmit a reply signal to a wireless charger (not shown) that initially transmitted the received signal. In the event that the received signal is not intended for or is not recognized by wireless charging module 710, wireless charging module 710 may attempt to extract energy from the received signal for charging battery 716.

It is noted that for each of the above described embodiments wherein each of wireless charging module 710 and NFC module 712 are operating in a passive mode, electronic device 700 may employ time domain multiplexing to sample incoming data. Accordingly, electronic device 700 may sample for incoming data by switching between a configuration wherein antenna 702 is coupled to wireless charging module 710 and decoupled from NFC module 712 and a second configuration wherein antenna 702 is coupled to NFC module 712 and decoupled from wireless charging module 710.

In accordance with another contemplated method of operation, each of NFC module 712 and wireless charging module 710 may be turned on, wireless charging module 710 may be operating in a passive mode, and NFC module 712 may be operating in an active mode. It is noted that this exemplary embodiment may include time domain multiplexing wherein antenna 702 is coupled to wireless charging module 710 or NFC module 712 based upon allocated activation time slots for wireless charging module 710 and NFC module 712. Accordingly, electronic device 700 may switch between a receive mode (i.e., each of wireless charging module 710 in a passive mode and coupled to antenna 702) and a transmit mode (i.e., NFC module 712 in an active mode and coupled to antenna 702). It is further noted that while NFC module 712 is operating in an active mode, wireless charging module 710 may be decoupled from antenna 702 via a switch, as described more fully below. Accordingly, in this exemplary embodiment, NFC module 712 may be configured to claim access to antenna 702 and, thereafter, actively transmit data.

Further, in this exemplary embodiment, wireless charging module 710 may be configured to convey a signal to NFC module 712 to request access to antenna 702. For example, in the event a charging level of battery 716 drops below a threshold value, wireless charging module 710 may convey a signal to NFC module 712 to request access to antenna 702 to enable wireless charging module 710 to receive wireless power from a wireless charger. Moreover, while operating in an active mode, NFC module 712 may be configured to periodically cease active transmission and allow wireless charging module 710 to claim access to antenna 702. It is noted that NFC module 712 may be configured to cease active transmission during a transaction or after completion of a transaction. More specifically, if a transaction has a relatively short duration (e.g., reading an identification tag), NFC module 712 may be configured to complete the transaction and, thereafter, allow wireless charging module 710 to claim access to antenna 702. If a transaction has a relatively long duration (e.g., NFC module 712 is transmitting or receiving a large amount of data), NFC module 712 may be configured to periodically cease active transmission during the transaction and allow wireless charging module 710 to claim access to antenna 702. Thereafter, NFC module 712 may regain access to antenna 702 to enable for NFC module 712 to continue with the transaction.

As previously noted above, electronic device 700 may employ time domain multiplexing to sample incoming data. Further, electronic device 700 may employ an adaptive time domain multiplexing approach wherein each of wireless charging module 710 and NFC module 712 may be configured to modify a time domain multiplexing schedule in response to one or more factors, such as, for example only, a charging level of battery 716, a time duration required for data transmission, and a time duration required for data reception. More specifically, for example, wireless charging module 710 may, upon detecting that a charging level of battery 716 is low, schedule a time slot for access to antenna 702 at a specific time and for a specific duration. Moreover, as another example, NFC module 712 may be configured to schedule and/or modify a time slot depending on how long NFC module 712 expects to be transmitting data, receiving data, or any combination thereof.

In accordance with another exemplary embodiment of the present invention, electronic device 700 may be configured to, upon reception of an NFC packet header in accordance with standard NFC protocol, detect coding within the packet header that may identify an incoming signal as being associated with wireless power. Upon detection of the coding, electronic device 700 may be configured to switch into a receive only time domain multiplexing mode wherein wireless charging module 710 may rectify the incoming signal and extract energy from the signal while intermittently listening for NFC communication.

It is noted that in the event a client (e.g., NFC module 712 or wireless charging module 710), which had previously recognized an incoming RF field, no longer recognizes the incoming RF field, the client may be configured to transfer the signal to another client. More specifically, for example, in the event that an RF field received by electronic device 700 changes from wireless power transmitted from a wireless charger to NFC related data transferred from another electronic device, wireless charging module 710 may transfer the signal to NFC module 712, which may then recognize the RF field as originating from an active NFC device. Thereafter, NFC module 712 may transmit a signal to wireless charging module 710 requesting access to antenna 702. Furthermore, in the event that an RF field, which was previously detectable by electronic device 700, is no longer detectable, electronic device 700 may be configured to transition to another mode. For example, wireless charging module 710 may be configured to transition to a "listening" mode wherein wireless charging module 710 may be enabled to listen for any resumption of the RF field. As another example, NFC module 712 may be configured to transition to an active mode.

Moreover, it is noted that electronic device 700 may comprise manual override functionality, automatic override functionality, or any combination thereof. More specifically, for example, electronic device 700 may be configured to allow a device user (i.e., a human operator) to enable or disable NFC module 712 at any time. Furthermore, electronic device 700 may be configured to allow a user to enable and cause NFC module 712 to operate in either an active mode or a passive mode at any time. Similarly, electronic device 700 may be configured to allow a user to enable or disable wireless charging module 710 at any time.

Furthermore, electronic device 700 may be configured to automatically modify the operational state of NFC module 712, wireless charging module 710, or both, upon detection of one or more events. More specifically, for example, upon detecting that a charging level of battery 716 has dropped below a threshold value, electronic device 700 may be configured to prevent NFC module 712 from operating in an active mode or, furthermore, may entirely disable NFC module 712. Additionally, upon detecting that a charging level of battery 716 has dropped below a threshold value, electronic device 700 may be configured to enable wireless charging module 710. On the other hand, upon detecting that a charging level of battery 716 has risen above a threshold value, electronic device 700 may be configured to enable NFC module 712 or, furthermore, may transition NFC module 712 to an active mode. Additionally, upon detecting that a charging level of battery 716 has risen above a threshold value, electronic device 700 may be configured to disable wireless charging module 710.

Figure 9:
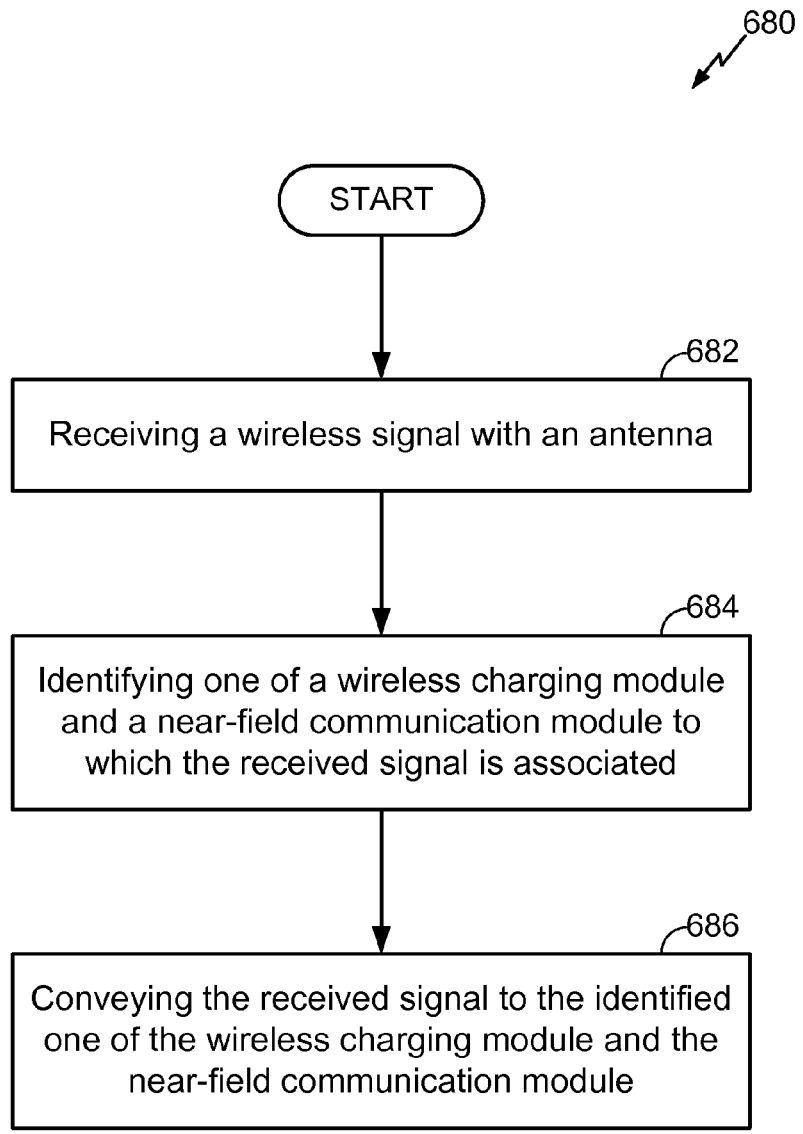
FIG. 9 is a flowchart illustrating a method, in accordance with an exemplary embodiment of the present invention.

FIG. 9 is a flowchart illustrating a method 680, in accordance with one or more exemplary embodiments. Method 680 may include receiving a wireless signal with an antenna (depicted by numeral 682). Method 680 may further include identifying one of a wireless charging module and a near-field communication module to which the received signal is associated (depicted by numeral 684). Furthermore, method 680 may include conveying the received signal to the identified one of the wireless charging module and the near-field communication module (depicted by numeral 686).

Figure 10:
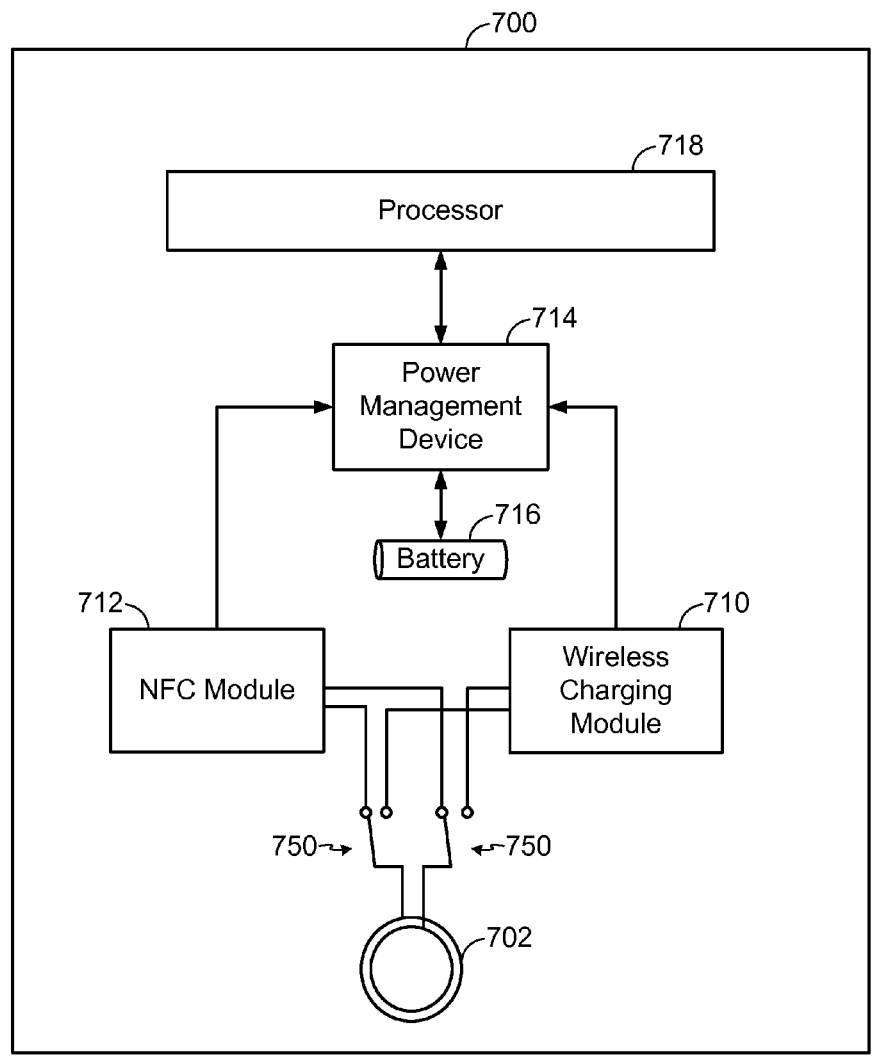
FIG. 10 is a block diagram of an electronic device including a switch, according to an exemplary embodiment of the present invention.

With reference to FIG. 10, electronic device 700 may further include a switch 750 configured to enable antenna 702 to be selectively coupled to either NFC module 712 or wireless charging module 710. More specifically, according to one configuration, switch 750 may couple antenna 702 to NFC module 712 and, furthermore, may decouple wireless charging module 710 from antenna 702. According to another configuration, switch 750 may couple antenna 702 to wireless charging module 710 and, furthermore, may decouple NFC module 712 from antenna 702. By way of non-limiting examples, and, as described more fully below, a configuration of switch 750 may be controlled by at least one of a mechanical selector, an orientation dependent selector, and a selector configured to react to a stimulant, such as a material (e.g., a metallic material), a light source, or a vibration.

Figure 11:
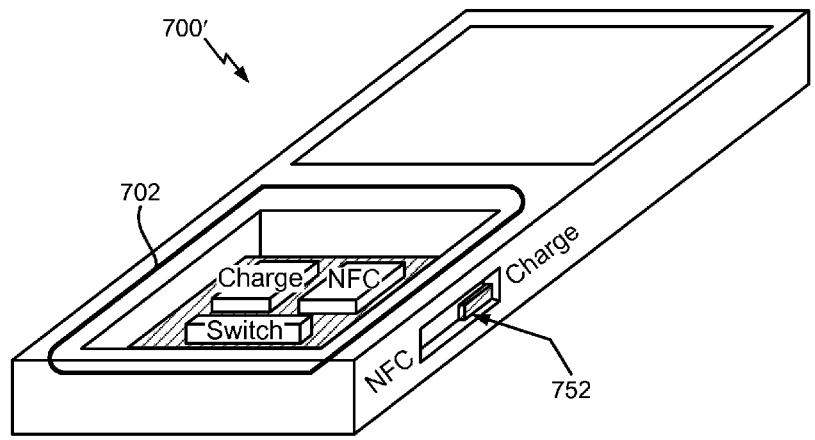
FIG. 11 depicts an electronic device including a mechanical selector, according to an exemplary embodiment of the present invention.

FIG. 11 illustrates an electronic device 700' having a mechanical selector 752 positioned on an external surface thereof and configured to control a configuration of switch 750 (see FIG. 9). Stated another way, while in a one position (i.e., an "NFC" position), mechanical selector 752 may cause switch 750 to enable antenna 702 to couple to NFC module 712. In another position (i.e., a "charge" position), mechanical selector 752 may cause switch 750 to enable antenna 702 to couple to wireless charging module 710. Accordingly, mechanical selector 752 may enable a device user (i.e., a human operator) to select a mode of operation of electronic device 700'. As one example, a device user may charge a battery of electronic device 700' by placing mechanical selector 752 to a "charge" position and placing electronic device 700' within a near-field region of a wireless charger. It is noted that mechanical selector 752 may be placed in a "charge" position to not only enable electronic device 700' to receive wireless power, but also to prevent electronic device 700' from operating in an NFC mode. For example, a device user may place mechanical selector 752 in a "charge" position upon boarding an airplane to prevent electronic device 700' from emitting radiation. As another example, mechanical selector 752 may be placed in a "charge" position to prevent NFC related activity and, therefore, limit power consumption.

Furthermore, a device user may exchange data (e.g., exchange files, transmit a mobile payment, etc.) with another electronic device by placing mechanical selector 752 in an "NFC" position and placing electronic device 700' within a near-field region of the electronic device. It is noted that in an embodiment wherein an electronic device comprises a mechanical selector, control of switch 750 may not be dependent on a user interface and, thus, switch 750 may remain operable in the event that a charging level of battery 716 is too low for the user interface to be active.

Figure 12:
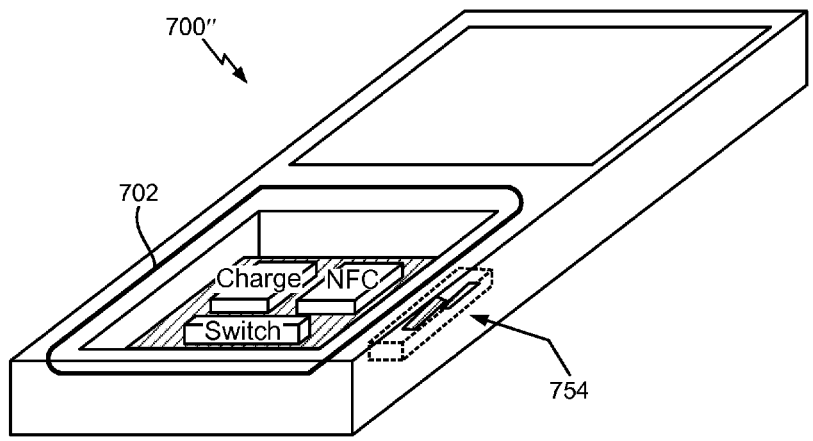
FIG. 12 depicts an electronic device including a selector, according to an exemplary embodiment of the present invention.

FIG. 12 depicts another electronic device 700" having a selector 754 configured to automatically control a configuration of switch 750 (see FIG. 10) upon an occurrence of one or more events. According to one exemplary embodiment, selector 754 may comprises a reed switch. More specifically, according to one exemplary embodiment, selector 754 may include a magnet and may be configured to automatically toggle to a specific position (i.e., a "charge" position or an "NFC" position) upon be located proximate a metallic device (e.g., a wireless charger). According to another exemplary embodiment, selector 754 may be configured to automatically toggle to a specific position (i.e., a "charge" position or an "NFC" position) upon be located proximate a magnet. It is noted that selector 754 may comprise a default position. Accordingly, in an exemplary embodiment wherein "NFC" is the default position, upon being positioned proximate a metallic device, selector 754 may toggle from the "NFC" position to the "charge" position. Furthermore, upon removing electronic device 700" from an area proximate a metallic device or a magnet, selector 754 may automatically reposition itself to the default "NFC" position. As an example, a device user may place electronic device 700" proximate a wireless charger comprising a metallic material. Upon placing electronic device 700" proximate the wireless charger, selector 754 may automatically toggle to a "charge" position and, thus, couple antenna 702 to wireless charging module 710. Furthermore, upon removing electronic device 700" from an area proximate the wireless charger, selector 754 may automatically reposition itself to a "NFC" position and, thus, couple antenna 702 to NFC module 712.

According to another exemplary embodiment, selector 754 may be configured to automatically toggle to a specific position (i.e., a "charge" position or an "NFC" position) upon detection of light at a specific frequency. Accordingly, in an exemplary embodiment wherein "NFC" is the default position, upon detection of light at the specific frequency, selector 754 may toggle from the "NFC" position to the "charge" position. Furthermore, in the event selector 754 no longer detects the light, selector 754 may automatically reposition itself to the default "NFC" position. For example, a device user may place electronic device 700" proximate a wireless charger having a light source configured to transmit light at a specific frequency. Upon placing electronic device 700" proximate the wireless charger, selector 754 may detect the light and automatically toggle to a "charge" position and, therefore, antenna 702 may be coupled to wireless charging module 710. Furthermore, upon removing electronic device 700" from an area proximate the wireless charger, selector 754 may automatically reposition itself to a "NFC" position and, therefore, antenna 702 may be coupled to NFC module 712.

Figure 13:
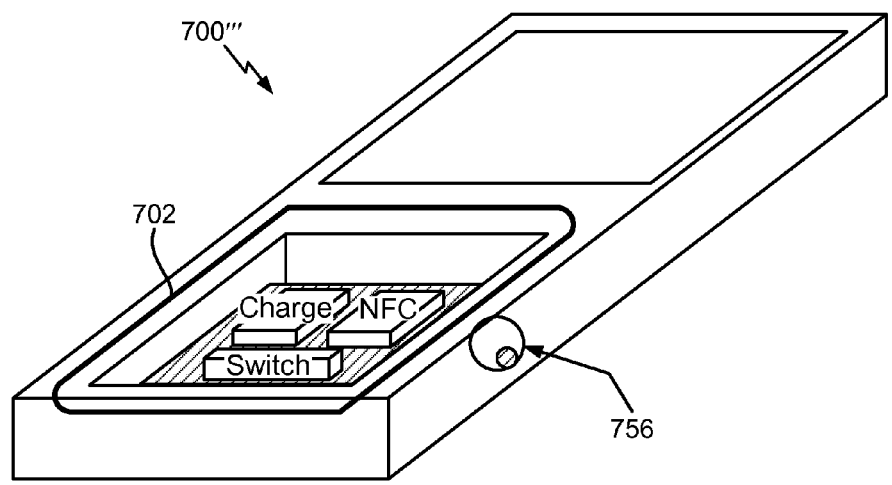
FIG. 13 depicts an electronic device including another selector, according to an exemplary embodiment of the present invention.

In accordance with other exemplary embodiments, selector 754 may be configured to toggle from a default position to another position upon occurrence of one or more other events, such as, for example only, sensing a vibration (e.g., a device user make shake electronic device 700" to toggle selector 754 to the "charge" position), sensing a heat source (e.g., a wireless charger may irradiate heat that may be detected and cause selector 754 to toggle to the "charge" position), or sensing an orientation of electronic device 700". For example, FIG. 13 depicts another electronic device 700''' having a selector 756 configured to automatically control a configuration of switch 750 (see FIG. 9) upon an occurrence of one or more events. According to one exemplary embodiment, selector 756 may comprise an orientation or positioned operated electrical switch. More specifically, according to one exemplary embodiment, selector 756 may comprise a sensor (e.g., a "tilt" sensor) configured to detect an orientation of electronic device 700'''. Further, selector 756 may be configured to automatically toggle to a specific position (i.e., a "charge" position or an "NFC" position) upon being positioned in a specific orientation.

Accordingly, in an exemplary embodiment wherein "NFC" is the default position, upon being positioned in a specific orientation (e.g., lying flat in a horizontal position), selector 756 may toggle from the "NFC" position to the "charge" position. Furthermore, upon removing electronic device 700''' from the specific orientation, selector 756 may automatically reposition itself to the default "NFC" position. As an example, a device user may place electronic device 700''' in a horizontal position on a surface of a wireless charger. Upon placement of electronic device 700''' in a horizontal position, selector 756 may automatically toggle to a "charge" position and, as a result, couple antenna 702 to wireless charging module 710. Furthermore, upon removing electronic device 700''' from the horizontal position, selector 756 may automatically reposition itself to the "NFC" position and, as a result, couple antenna 702 to NFC module 712.

Figure 14:
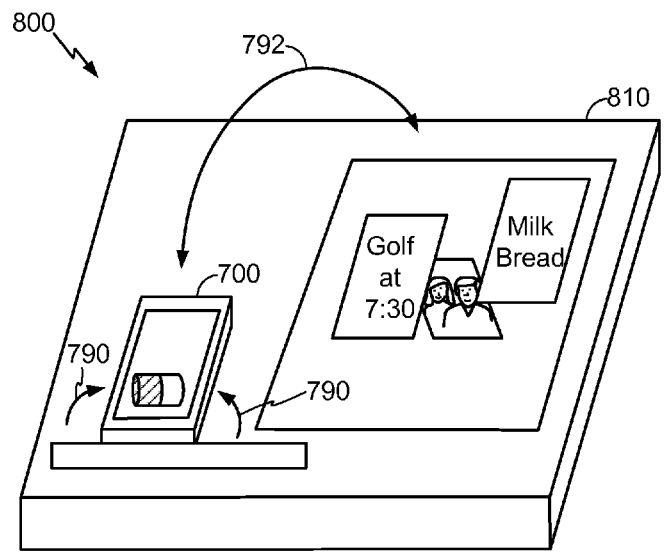
FIG. 14 depicts a system including a plurality of electronic devices, according to an exemplary embodiment of the present invention.

FIG. 14 illustrates a system 800 including electronic device 700 positioned proximate an electronic device 810, which may be configured for transmitting wireless power within a near-field region. Further, electronic device 810 may be configured to wirelessly communicate via NFC means. In accordance with one or more of the various embodiments described herein, electronic device 700 may be configured to wirelessly receive power (depicted by arrows 790) transmitted from electronic device 810 and communicate (e.g., synchronize and/or transfer files) (depicted by arrow 792) with electronic device 810 via NFC means.

Figure 15:
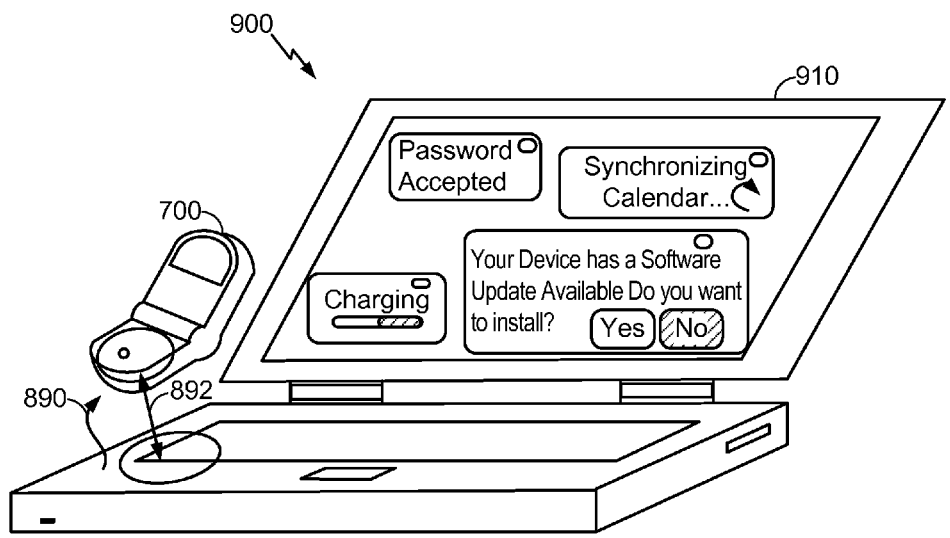
FIG. 15 depicts another system including a plurality of electronic devices, in accordance with an exemplary embodiment of the present invention.

FIG. 15 illustrates another system 900 including electronic device 700 positioned proximate an electronic device 910, which is depicted as a laptop computer. Electronic device 910 may be configured for transmitting wireless power within a near-field region and communicating via NFC means. Electronic device 700 may configured to receive wireless power transmitted from electronic device 910 and, further, may be configured to establish a communication link with electronic device 810 via NFC means. As such, according to one or more of the various embodiments described herein, electronic device 700 may receive wireless power (depicted by arrow 890) from electronic device 910 to charge battery 716, and, moreover, may exchange data (depicted by arrow 892) with electronic device 910 via an NFC link.

It is noted that in comparison to wireless power, a power level of an NFC signal may be relatively low. Accordingly, various embodiments of the present invention may comprise adequate means for preventing received wireless power from damaging an NFC receiver (e.g., NFC module 712).

Exemplary embodiments of the present invention, as described above, may enable for wireless charging and NFC technologies to coexist on a single electronic device while mitigating interference issues between the two technologies. Furthermore, the various embodiments described herein may allow for reuse of hardware, such as, for example, antenna hardware. Accordingly, costs associated with design, fabrication, and use of an electronic device may be reduced.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A method of providing wireless charging power, comprising:
   receiving a wireless signal with an antenna for identifying one of a wireless charging circuit and a communication circuit associated with the wireless signal; and
   coupling the antenna to the one of the circuits via a switch in response to identifying the one of the circuits by the wireless signal, the antenna being coupled to the communication circuit in a default mode of operation, the wireless signal comprising information within a communication packet header.

2. The method of claim 1, wherein receiving the wireless signal includes sending a signal from the wireless charging circuit to the communication circuit requesting access to the antenna or sending a signal from the communication circuit to the wireless charging circuit requesting access to the antenna.

3. The method of claim 1, further comprising detecting an orientation of the antenna and the switch between one of the wireless charging circuit and the communication circuit based on the detected orientation.

4. The method of claim 1, wherein the information comprises coding within the communication packet header.

5. The method of claim 1, wherein the communication packet header comprises an NFC packet header.

6. The method of claim 1, wherein the wireless signal comprises energy fluctuations.

7. The method of claim 1, wherein the communication circuit comprises a near-field communication circuit.

8. The method of claim 1, wherein the wireless signal comprises a charging level of a battery of the electronic device.

9. The method of claim 1, wherein receiving the wireless signal further comprises receiving an input from a sensor.

10. The method of claim 9, further comprising receiving light at a first frequency by the sensor.

11. The method of claim 9, further comprising detecting vibration by the sensor.

12. The method of claim 9, further comprising detecting orientation of the antenna by the sensor.

13. A wireless power apparatus for providing wireless charging power, comprising:
    means for receiving a wireless signal for identifying one of a wireless charging circuit and a communication circuit associated with the wireless signal; and
    means for conveying the wireless signal to the identified one of the circuits in response to identifying one of the circuits by the wireless signal, the receiving means being coupled to the communication circuit in a default mode of operation, the wireless signal comprising information within a communication packet header.

14. The wireless power apparatus of claim 13, further comprising a battery operably coupled to the wireless charging circuit and configured to receive power from the wireless charging circuit.

15. The wireless power apparatus of claim 13, wherein the wireless charging circuit is configured to extract energy from a communication signal.

16. A wireless power apparatus for providing wireless charging power, comprising:
    an antenna configured to receive a wireless signal;
    a communication circuit configured to identify one of a wireless charging circuit and the communication circuit associated with the wireless signal; and
    a switch configured to convey the wireless signal to the identified one of the circuits associated with the wireless signal, the antenna being coupled to the communication circuit in a default mode of operation, the wireless signal comprising information within a communication packet header.

17. The wireless power apparatus of claim 16, wherein the switch is configured to selectively couple the antenna to one of the communication circuit and the wireless charging circuit.

18. The wireless power apparatus of claim 17, further comprising at least one of a mechanical selector and a sensor configured to detect an orientation of the wireless power apparatus, the selector and the sensor configured to automatically control the configuration of the switch based on the detected orientation.

19. The wireless power apparatus of claim 16, wherein each of the wireless charging circuit and the communication circuit is configured to transfer the wireless signal to each other.

20. The wireless power apparatus of claim 16, further comprising a sensor configured to detect coding the information within the communication packet header of the wireless signal.

21. The wireless power apparatus of claim 16, wherein the wireless charging circuit is configured to send a signal from the wireless charging circuit to the communication circuit and request access to the antenna.

22. The wireless power apparatus of claim 16, wherein the communication circuit comprises a near-field communication circuit.

* * * * *